(12) United States Patent
Startchik

(10) Patent No.: US 10,297,873 B2
(45) Date of Patent: May 21, 2019

(54) BATTERY ASSEMBLY AND BATTERY UNIT FOR ELECTRIC VEHICLES

(71) Applicant: Sergei Startchik, Geneva (CH)

(72) Inventor: Sergei Startchik, Geneva (CH)

( * ) Notice: Subject to any disclaimer, the term of this patent is extended or adjusted under 35 U.S.C. 154(b) by 245 days.

(21) Appl. No.: 15/317,024

(22) PCT Filed: Jun. 3, 2015

(86) PCT No.: PCT/IB2015/000835
§ 371 (c)(1),
(2) Date: Dec. 7, 2016

(87) PCT Pub. No.: WO2015/189671
PCT Pub. Date: Dec. 17, 2015

(65) Prior Publication Data
US 2017/0117593 A1 Apr. 27, 2017

(51) Int. Cl.
*H01M 10/44* (2006.01)
*H01M 2/10* (2006.01)
(Continued)

(52) U.S. Cl.
CPC ....... *H01M 10/441* (2013.01); *B60L 11/1822* (2013.01); *B60L 11/1877* (2013.01);
(Continued)

(58) Field of Classification Search
CPC .............. B60L 11/1822; B60L 11/1877; B60L 11/1879; B60Y 2400/112; H01M 10/441;
(Continued)

(56) References Cited

FOREIGN PATENT DOCUMENTS

| DE | 102010018698 A1 | 11/2011 |
|----|-----------------|---------|
| GB | 2050042 | 12/1980 |
| GB | 2518196 A | 3/2015 |

OTHER PUBLICATIONS

International Preliminary Report on Patentability for corresponding PCT Application No. PCT/IB2015/000835 dated Dec. 15, 2016.

*Primary Examiner* — Carlos Barcena
(74) *Attorney, Agent, or Firm* — Dinsmore & Shohl LLP; Weston R. Gould

(57) ABSTRACT

A battery unit comprising a shell made of an electrically insulating shell material, with a plurality of electrically conductive outer pads on the external surface of the shell, the conductive outer pads being electrically insulated from each other; a battery cell within the shell for storing and providing electrical energy, the battery cell comprising an anode and a cathode; wherein at least some outer pads are in electrical contact either with the anode or with the cathode, the polarity of each outer pad depending on its position relative to the geometric center of the battery unit in a referential determined by the direction of an external force, independently from the orientation of the battery unit within said referential. A battery assembly for an electric device, the battery assembly comprising a plurality of such battery units; an enclosure for containing the battery units; an assembly cathode located on a first side of the enclosure, the assembly cathode being in electrical contact with outer pads of battery units that are in contact with the first side; an assembly anode located on a second side of the enclosure opposite the first side, the assembly anode being in electrical contact with outer pads of battery units that are in contact with the second side. A method for providing electrical energy to an electric device, the method comprising the steps of providing a plurality of charged battery units as described above; randomly filling an enclosure of a battery assembly with the plurality of battery units; and applying an external
(Continued)

force to the battery units within the enclosure for orienting the polarity of the outer pad of the battery units all in the same orientation relative to said external force.

13 Claims, 16 Drawing Sheets

(51) Int. Cl.
    *B60L 11/18*     (2006.01)
    *H01M 2/02*     (2006.01)
    *H01M 2/06*     (2006.01)
    *H01M 2/20*     (2006.01)
    *H01M 2/30*     (2006.01)

(52) U.S. Cl.
    CPC ......... *B60L 11/1879* (2013.01); *H01M 2/024* (2013.01); *H01M 2/0245* (2013.01); *H01M 2/06* (2013.01); *H01M 2/1072* (2013.01); *H01M 2/1077* (2013.01); *H01M 2/206* (2013.01); *H01M 2/305* (2013.01); *B60Y 2400/112* (2013.01); *H01M 2/0277* (2013.01); *H01M 2220/20* (2013.01); *Y02T 10/7005* (2013.01); *Y02T 10/705* (2013.01); *Y02T 10/7072* (2013.01); *Y02T 90/124* (2013.01); *Y02T 90/14* (2013.01)

(58) Field of Classification Search
    CPC ............. H01M 2220/20; H01M 2/024; H01M 2/0245; H01M 2/0277; H01M 2/06; H01M 2/1072; H01M 2/1077; H01M 2/206; H01M 2/305; Y02T 10/705; Y02T 10/7072; Y02T 90/124; Y02T 90/14
    See application file for complete search history.

BATTERY ASSEMBLY AND BATTERY UNIT FOR ELECTRIC VEHICLES

FIELD OF THE INVENTION

The present invention relates to a power supply system for electric vehicles. The present invention relates in particular to a battery assembly and battery units that facilitate and speed up the charging of electric vehicles, in particular of electric cars.

BACKGROUND OF THE INVENTION

Electric devices, in particular electric cars or other electric vehicles, suffer from the long charging time of their batteries. Long charging time leads to the necessity for the car, or vehicle, to be immobilized while the battery is being charged, or for the often voluminous battery or battery assembly to be replaced. Replacement of the battery implies that the voluminous battery is extracted from the car at a charging station and placed for charging while a readily charged battery is inserted into the car.

The latter solution implies compatibility of battery formats between cars, large storage spaces for charged batteries and fast replacement process for replacing a battery.

The battery replacement time in the best current solutions is approximately 2 minutes, which is probably acceptable for the drivers. However, with an average of 1000 visits to a gas station per day, a corresponding number of batteries need to be stored at the gas station, either charging or ready to be inserted into a car. With an average size of 1.2×1×0.6 meters per battery or battery assembly, the necessary storage space implies a significant infrastructure investment and a significant change in the conception of the gas station itself.

Aims of the present invention thus comprise providing an electric car battery assembly that allows recharging the battery of a car in an acceptable time frame, for example in less than two minutes, that is compatible with any car make or model, that requires a minimal recharging facility infrastructure, that does not require fundamentally changing the organization of existing gas stations, and that may provide for some more advantages as "side products".

BRIEF DESCRIPTION

These aims and other advantages are achieved with a battery unit and a battery assembly according to the corresponding independent claim.

These aims and other advantages are achieved in particular with a battery unit comprising a shell made of an electrically insulating shell material, with a plurality of electrically conductive outer pads on the external surface of the shell, the conductive outer pads being electrically insulated from each other; a battery cell within the shell for storing and providing electrical energy, the battery cell comprising an anode and a cathode; wherein at least some outer pads are in electrical contact either with the anode or with the cathode, the polarity of each outer pad depending on its position relative to the geometric center of the battery unit in a referential determined by the direction of an external force, independently from the orientation of the battery unit within said referential.

In embodiments, the battery cell is freely orientable within the shell and configured for being orientable under the effect of the external force. The external force is for example the earth gravity, and the center of gravity of the battery cell doesn't coincide with its geometric center. In embodiments, the anode and the cathode are then located on the surface of the battery cell, on sides of the battery cell opposite from each other, and proximate to a symmetry axis going through the center of gravity and through the geometric center of the battery cell. The outer pads in electrical contact with the anode are for example within the lower half of the battery unit, while the outer pads in electrical contact with the cathode are located within the upper half of the battery unit when the battery cell is in a stable position relative to said external force, or opposite, battery unit 1 according to any one of the preceding claims, said battery cell 7 being freely orientable relative to said shell 3, the orientation of said battery cell 7 within said shell 3 being determined by the direction of said external force.

In embodiments, the shell forms a spherical interior space and the battery cell inside the shell is freely rotatable around any axis relative to the shell.

In embodiments, the shell further comprises electrically conductive inner pads on its inner surface, wherein each outer pad is in electrical contact with an inner pad. The anode and the cathode are then for example portions of the surface of the battery cell that are in electrical contact each with at least some of the inner pads.

These aims and other advantages are achieved also with a battery assembly for an electric device, the battery assembly comprising a plurality of such battery units; an enclosure for containing the battery units; an assembly cathode located on a first side of the enclosure, the assembly cathode being in electrical contact with outer pads of battery units that are in contact with the first side; an assembly anode located on a second side of the enclosure opposite the first side, the assembly anode being in electrical contact with outer pads of battery units that are in contact with the second side. In embodiments, the enclosure of the battery assembly comprises at least one opening for loading the battery units into the enclosure and/or for removing the battery units from the enclosure.

These aims and other advantages are furthermore achieved with a method for providing electrical energy to an electric device, the method comprising the steps of providing a plurality of charged battery units as described above; randomly filling an enclosure of a battery assembly with the plurality of battery units; and applying an external force to the battery units within the enclosure for orienting the polarity of the outer pad of the battery units all in the same orientation relative to said external force.

Thanks to the ability of the battery cell to orient itself under the action of an external force inside the battery unit's shell, the polarity of the battery unit automatically orients itself in a determined direction and orientation relative to said force, for example the force of gravity, or any appropriate force. This allows randomly loading relatively small battery units into a container, and all battery units orient themselves automatically for forming a larger battery assembly able to power an electric device such as an electric vehicle, for example.

The battery units may for example be granular and loaded/unloaded with pistols similar to those used for liquid fuels, thereby greatly reducing the time for charging the device's battery.

DISCLOSURE OF PREFERRED EMBODIMENTS

Figure 1:
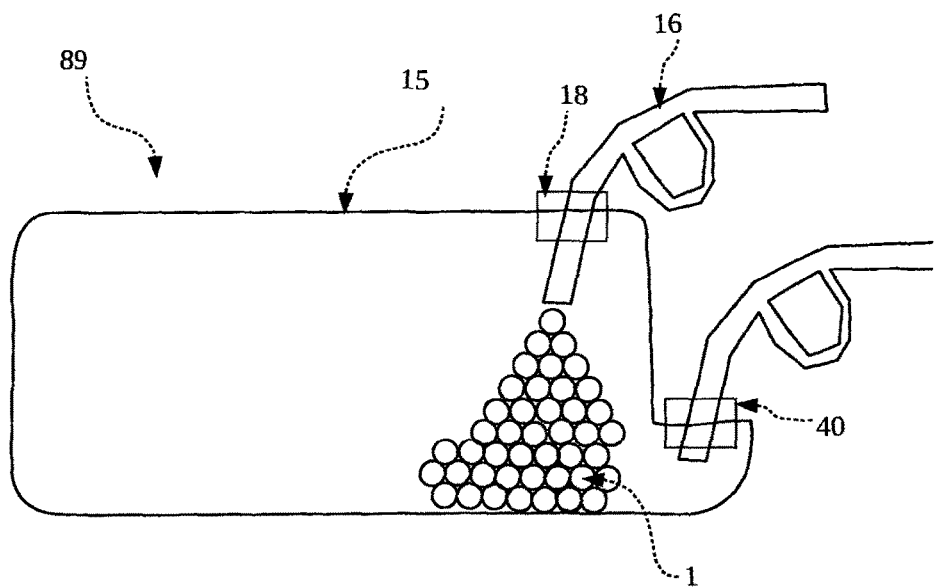
FIG. 1: is a schematic cut view of an enclosure of a battery assembly according to an embodiment of the invention.

With reference for example to FIG. 1, the battery assembly 89 of the invention comprises a plurality of battery units 1 that are located within an enclosure 15, for example within a tank similar to the tanks used in conventional cars for storing gasoline. Each battery unit 1 is a standalone device and is placed for example randomly within the enclosure 15.

As explained more in details below, each battery unit 1 is configured for storing electrical energy and providing it through electrically conductive outer pads located on its outer surface.

When the enclosure 15 is filled with battery units 1, the battery units 1 are for example randomly piled on each other within the enclosure 15, and at least some of the outer pads of each battery unit 1 are in electrical contact with outer pads of neighboring battery units, thereby forming a battery assembly with the required electric characteristics for powering an electric device, for example an electric vehicle. When the electric vehicle or other device powered by the battery assembly 89 of the invention needs to be recharged, the discharged battery units 1 are removed from the enclosure 15, which is then filled up with charged battery units 1.

The way the enclosure 15 is filled with battery units 1 according to embodiments of the invention is illustrated in FIG. 1. A pistol 16, preferably similar or identical to the ones used in most gas stations, is used to fill the enclosure 15. The pistol 16 is connected, for example through a flexible hose, to a reservoir of charged battery units, which is not represented in FIG. 1. The dimension and shape of the battery units 1 are preferably adapted for them to freely flow within the pistol 16 and the hose. When the pistol 16 is actuated, charged battery units are pushed out of and/or aspirated from the reservoir through the hose and out of the pistol 16 into the enclosure 15.

The enclosure 15 for example comprises a first opening 18, preferably in its upper part, allowing the insertion of the tip of the pistol 16 within the enclosure 15. An empty enclosure 15 is thus filled up with charged battery units 1 for example in that the pistol 16 is at least partly inserted in the first opening 18 and then actuated for flowing charged battery units 1 out of it and into the enclosure 15. The dumping of the battery units 16 into the enclosure 15 is preferably random and their resulting relative arrangement inside the enclosure 14 follows a self-organizing scheme due to their shape and design, which is described below.

When an electrical device, for example an electric vehicle, with a discharged battery assembly 89 needs to be recharged, the enclosure 15 is first emptied from the discharged battery units 1. In case of a single first opening 18, a pistol, for example the same pistol 16 as the one used for filling up the enclosure 15, is used to pump the batteries out of the enclosure 15, for example though vacuum. In order to completely empty the enclosure 15 from the discharged battery units 1, the pistol is for example adapted to follow the level of battery units 1 inside the enclosure 15 and thereby reach the bottom of the tank.

In embodiments, the enclosure 15 comprises a second opening 40 for emptying the enclosure 15. The second opening is then for example closer to the bottom of the enclosure 15 in order to facilitate the pumping of all battery units 1 out of the enclosure 15 with a pistol 16. In other embodiments, the second opening is located at the bottom of the enclosure, for example in its floor. The enclosure is then emptied by opening the second opening and allowing the discharged battery units to be extracted from the enclosure.

The first opening 18, and possibly second opening 40 preferably each comprise a preferably hermetic lid, which is not represented on the figures, for closing the enclosure 15 when the battery assembly 89 is complete and/or in use.

The methods and devices for filling up and emptying the enclosure 15 described above are illustrative but in no way limiting examples. Other methods and devices are possible within the frame of the invention. According to the invention, however, the battery units 1 are preferably randomly loaded, for example poured into the enclosure 15 and organize themselves in a self-organizing scheme to build a battery assembly 89 with the electric characteristics required for its intended use.

Figure 2:
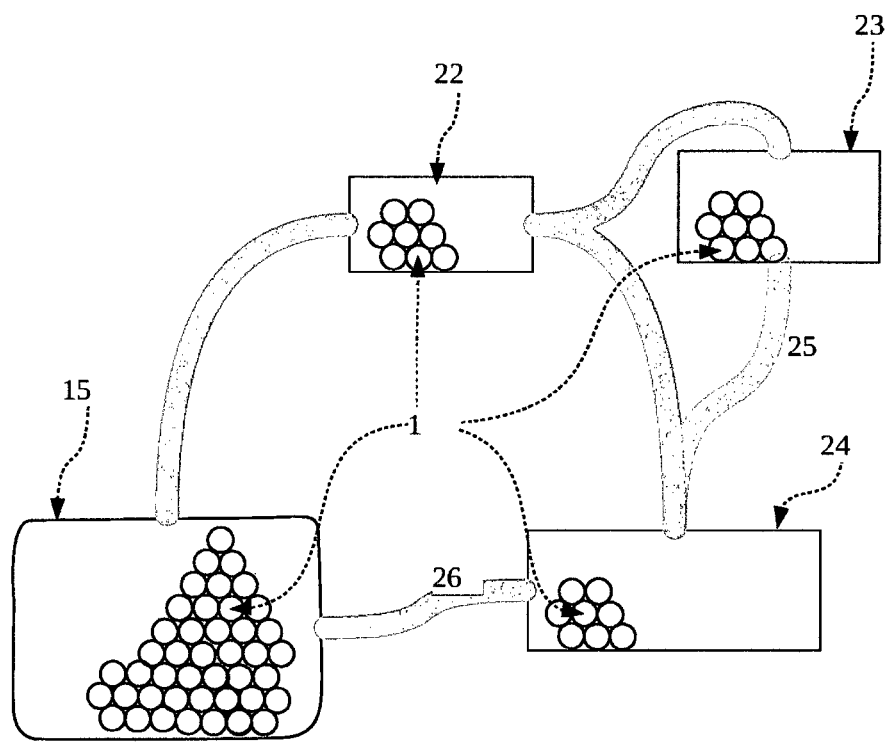
FIG. 2: illustrates the recharging cycle of battery units according to an embodiment of the invention.

FIG. 2 illustrates the cycle of the battery units 1 according to embodiments of the invention. When for example an electric vehicle needs recharging, the discharged battery units are extracted from the enclosure 15 by an appropriate method. The charge level of preferably each extracted battery unit is checked at a charge control station 22. In embodiments, several battery units 1 can be checked at once in parallel at the charge control station 22. If its charge level is acceptable, i.e. above a predefined threshold, the battery unit 1 is returned to a charged battery units reservoir 24 of charged battery units 1, where it is stored for future use. The discharged battery units 1, i.e. the battery units 1 whose charge level is below the predefined threshold, are fed into a preferably automatic parallel charging station 23, where several battery units 1 can preferably be charged in parallel in order to reduce the total charging time and thereby increase the system's overall efficiency. Once charged, the battery units 1 are fed to the charged battery units reservoir 24 of charged battery units 1. The charged battery units reservoir 24 is preferably constantly filled with charged battery units 1 in order to always be ready for immediate filling of one or more battery enclosures. In embodiments, each battery units 1 is checked for defects, for example mechanical and/or electrical defects before and/or after their charging in the parallel charging station 23, thereby guaranteeing that the battery assembly of the invention is fully functional when the corresponding enclosure is filled with charged battery units. Once the enclosure 15 has been emptied from the discharged battery units 1, it can immediately be filled with charged battery units 1 from the charged battery units reservoir 24. Preferably the charge control station 22, parallel charging station 23, charged battery units reservoir 24 are equipped with electrically insulating walls.

According to the invention, the battery units 1, when placed in the enclosure 15, organize themselves in a free and self-organizing structure that forms a battery assembly having the required electrical characteristics. In order for a plurality of battery units 1 to combine their charge and act as a larger battery assembly with the required electrical characteristics for powering a corresponding electric device, for example an electric vehicle, the randomly piled up battery units 1 must organize themselves in a self-organizing structure in which they are electrically connected to each other with the correct polarities despite their random orientation relative to each other.

Figure 3:
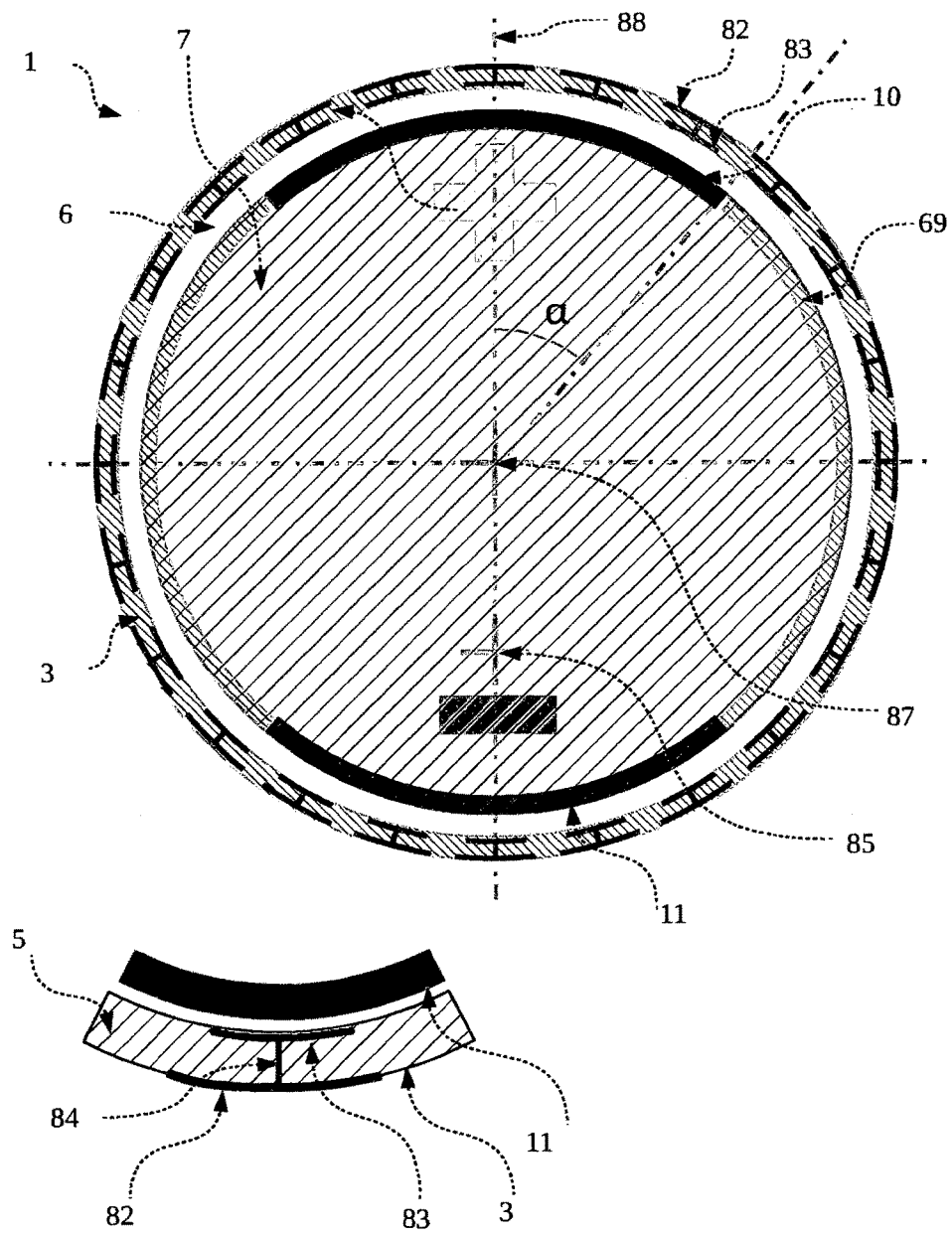
FIG. 3: show cut views of a battery unit according to an embodiment of the invention.

FIG. 3 is a schematic cut view of a battery unit 1 according to an embodiment of the invention. The battery unit 1 comprises a shell 3, for example a spherical shell 3, and a battery cell 7 inside said shell 3. The battery cell 7 hosts the actual electric battery, i.e. is configured for storing electrical energy and providing it through its electrodes, a cathode 10 and anode 11. The battery cell 7 can preferably freely take any orientation relative to the shell 3, for example freely spin around any axis within the shell 3. The shell 3 for example forms a spherical interior space in which the battery cell 7 is located. The space between the outer surface of the battery cell 7 and the inner surface of the shell 3 is for example filled with an insulating lubricant 6, that facilitates the movement, for example the spinning, of the battery cell 7 inside the shell 3 while preventing undesired short circuits between the electrodes 10 and 11 of the battery cell 7.

Since the position of the shell 3 in an enclosure of a battery according to the invention is random, the battery cell 7 must orient itself correctly inside the shell 3 and operate normally despite shocks, pressure from its neighbors, dust, humidity and wear out.

In embodiments, the cathode 10 and anode 11 are for example each an electrically conductive portion of the outer surface of the battery cell 7. In the example illustrated in FIG. 3, the cathode 10 and anode 11 each form a cap of electrically conductive material on opposite poles of the spherical battery cell 7. Other configurations of the electrodes 10 and 11 are however possible within the frame of the invention.

The shell 3 of the battery unit 1 is made essentially of an insulating shell material 5 and comprises electrically conductive outer pads 82 on its outer surface and electrically conductive inner pads 83 on its inner surface. The outer pad 82 do not touch each other and are thus electrically insulated from each other by the insulating shell material 5. Similarly, the inner pad 83 do not touch each other and are thus electrically insulated from each other by the insulating shell material 5 as shown on the detail view in the lower left part of FIG. 3. The insulating shell material 5 and/or the material of the electric pads 82, 83 may be rigid, semi-rigid or flexible depending on the intended use of the battery unit 1.

The outer pads 82 and inner pads 83 are for example made of conductive metal, while the insulating shell material 5 is a semi-rigid plastic that may be slightly deformed under pressure and elastically take its initial shape back when the pressure is relieved. Alternatively, the insulating shell material 5 is a rigid plastic, glass, or other synthetic material. Any other appropriate material may however be used within the frame of the invention for the insulating shell material 5 and/or for the outer pad 82 and inner pad 83.

Each outer pad 82 is preferably in electrical contact with an inner pad 83. In embodiments, each outer pad 82 is in electrical contact with exactly one inner pad 83, thus forming a pair of electrically conductive pads 82, 83 in electrical contact with each other through a conductive rod 84, wherein each pad of the pair of pads lays on an opposite surface of the shell 3. Other schemes of electrical contacts between the outer pads and the inner pads are however possible within the frame of the invention.

The pairs of pads 82, 83 are for example formed in that each pad 82, 83 is applied on the respective surface of the shell 2 and connected to the other pad 82, 83 of the same pair through a conductive rod 84 extending through the insulating shell material 5 of the shell 3 from one pad to the other. The outer and inner pads from a same pair of pads are for example assembled by pressure, similarly to rivets. Other construction of the shell 3 are however possible within the frame of the invention as shown for example on lower part of FIG. 14. In embodiments described below in relation with the lower part of FIG. 14, the shell is for example made of an assembly of electrically conductive tile 91 and electrically insulating tile 92 that are accessible from the outer and from the inner surface of the shell 3. Each electrically conductive tile, or group of electrically conductive tiles, is electrically insulated from other electrically conductive tiles by electrically insulating tiles. The inner and outer surface of each electrically conductive tile thereby form an inner and an outer conductive pad, respectively.

According to the invention, the battery cell 7 can freely take any orientation, for example freely spin around any axis, relative to the shell 3.

In embodiments, and with reference to FIG. 3, the center of gravity 85 of the battery cell 7 doesn't coincide with its geometric center 87. Under the effect of earth gravity, the battery cell 7 thus tends to orient itself inside the shell 3 such that the symmetry axis 88 passing through the center of gravity 85 and the geometric center 87, is oriented vertically, with the center of gravity 85 below the geometric center 87, i.e. closer to the ground. The cathode 10 and anode 11 are preferably also aligned on the symmetry axis 88, on opposite sides of the outer surface of the battery cell 7, such that when the battery cell 7 has reached a stable position inside the shell 3 under the effect of earth gravity, a first electrode, for example the cathode 10, is positioned in the upper part of the battery cell 7, while the second electrode, for example the anode 11, is positioned in the lower part of the battery cell 7. Once the battery cell 7 is in a stable position inside the shell 3, the inner pad 83 and the corresponding outer pad 82 located in the upper part of the battery unit 1 are thus in contact with the first electrode, for example with the cathode 10, while the inner pad 83 and the corresponding outer pad 82 located in the lower part of the battery unit 16 are in contact with the second electrode, for example with the anode 11. The inner pad 83 and corresponding outer pad 82 located around a horizontal plane passing through the geometric center 87 of the battery cell 7 are preferably not connected with any electrode of the battery cell 7 and are thus electrically undefined. For the sake of simplicity, this electrical polarity of the pads will be qualified hereafter as being neutral.

The polarity of the battery unit 1 is thus self-orienting relative to the ground, with for example positive electric contacts in its upper part and negative electric contacts in its lower part once the battery cell 7 inside it is in a stable position, independently of the position of the shell 3.

In embodiments, the electrodes 10, 11 on the surface of the battery cell 7 are located around the poles of the battery cell 7, within a virtual revolution cone having its summit at the geometric center 87 of the battery cell 7 and a half-angle $\alpha$ at the summit. $\alpha$ is preferably equal or smaller than 45°, even more preferably equal to or smaller than 30°. Accordingly, the outer pad 82 outside these virtual cones are not connected to any electrode, thereby providing for a series of neutral contacts 69 around a horizontal plan going through the geometric center 87 of the battery cell 7. As explained below, this series of neutral contacts 69 allows preventing undesired electric contacts between positive or negative contacts of same polarity of two neighboring battery cells in a battery assembly according to the invention.

In the above example and on the figures, the positive electrode and pads are shown to be in the upper part of the battery unit 1, while the negative electrode and pads are in the lower part. Other configurations are however possible within the frame of the invention. In particular, the battery unit of the invention may be configured such that the negative electrode and pads are located in the upper part of the battery unit once the battery cell 7 is stabilized, while the positive electrode and pads are located in the lower part.

The position of the center of gravity 85 of the battery cell 7 may be determined in any suitable manner. In embodiments, the elements inside the battery cell 7 are for example positioned such that most of the heavier ones are located on the same side of the battery cell 7, and/or some specific load is added in a particular location inside the battery cell 7, etc. In other embodiments, air is for example captured inside the battery cell 7, thereby lightening a particular side of the battery cell 7. In still other embodiments, heavier and/or lighter elements are attached outside the battery cell 7. For example, air may be captured between a part of one of the electrodes of the battery cell 7 and the inner surface of the shell 3, for example in a circular groove centered around the symmetry axis 88 that passes through the geometric center 87 and the center of gravity 85 of the battery cell 7. The circular groove is then preferably large enough to contain a determined amount of air. The air is captured inside the groove by the close contact between the contact surface of the electrode and the inner surface of the shell 3 at the edges of the groove and/or thanks to the surface tension of a liquid insulating lubricant 6 that fills the remaining space between the battery cell 7 and the shell 3. The above embodiments may of course be combined with each other in order to achieved the desired offset between the geometric center 87 and the center of gravity 85.

In the above embodiments, the battery cell 7 orients itself relative to the ground within the shell 3 under the effect of the force of gravity. Other forces may however be used in order to orient the battery cell inside the shell and thus position the positive and negative contacts of the battery unit, preferably without moving the shell. In such cases, the center of gravity of the battery cell preferably coincides with its geometric center in order to avoid orientation errors due to gravity. The battery cell may for example be oriented under the influence of an external magnetic force, wherein a magnetic element integrated into the battery cell and/or attached to the battery cell tends to orient itself in a determined direction relative to the direction of the magnetic force, thereby forcing the battery cell to which it is attached and/or in which it is integrated into the same orientation. Orientation of the battery cell is thus achieved similarly to the orientation of a compass relative to the earth's magnetic field, for example.

Advantages of using an external force other than the force of gravity for orienting the cellular cell, i.e. for orienting the polarity of the battery unit, includes the fact that the orientation of the battery units in a battery assembly according to the invention, and thus the functioning of the battery assembly, may then be made nonsensitive to other external forces such as for example centrifugal forces that may occur in a moving vehicle. This is however achieved at the expense of energy, for example electrical energy for generating the magnetic field.

According to yet other embodiments, the self-orientation of the battery cell is achieved once electric current starts flowing through the battery units.

In still other embodiments, orientation of the battery cell is maintained by spinning it after the battery unit is loaded in the enclosure and maintaining the rotation axis of all battery cells of all battery units constant.

According to other embodiments, the battery units are polarized by laser in which case the shell and battery cell should be transparent.

Figure 15:
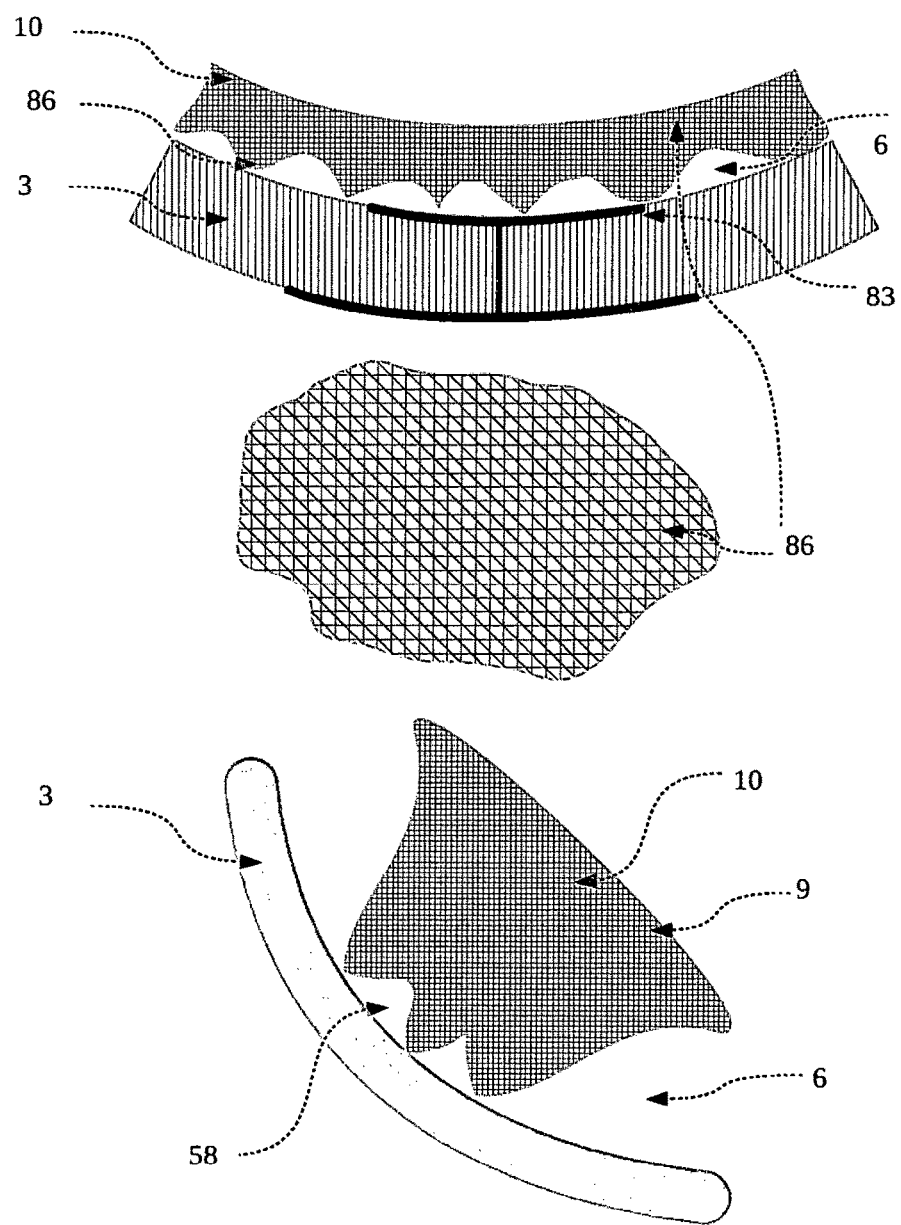
FIG. 15: Illustrates surface structures according to various embodiments of the invention.

In embodiments, in order to facilitate the movement of the battery cell 7 inside the shell 3 while still ensuring a good electrical contact between the electrodes 10, 11 of the battery cell 7 and the inner pad 83, the contact surface of the electrodes 10, 11 is structured as shown on FIG. 15 in cut view and plane view. Structuring the contact surface of the electrodes allows for example at least some insulating lubricant 6 to flow between the electrodes 10, 11 and the shell 3, thereby avoiding gripping between their respective surfaces and avoiding slow spinning due to superficial tension effects of the insulating lubricant 6, while allowing electrical contact between at least some spikes of the structured contact surface of the electrodes and corresponding inner pads.

The structured contact surface for example comprises several series of parallel grooves that form a texture with channels 86, each series being in a different direction, thereby creating a mesh of grooves on the contact surface electrodes of the 10, 11. For example, some insulating lubricant 6 may thus flow inside the grooves, while the parts of the contact surface between the grooves form contact elements for the electrical contact between the contact surface of the electrodes 10, 11 and the corresponding inner pads 83. These grooves preferably allow an even distribution of the insulating lubricant 6 across the gap between the shell 3 and battery unit 1 thereby optimizing the gliding of the internal elements.

In an embodiment, the spinning of the battery cell inside the shell is possible after enclosure that has been filled and before the electrical current flows through the battery assembly.

In embodiments, the battery comprises contact element 9 with a surface comprising a plurality of preferably gliding surface profile or smooth spikes 58, or other appropriate pattern as shown on the lower half of FIG. 15. Such spikes 58 are designed to improve the electrical contact between the corresponding surfaces. At the same time, the spaces between the spikes of the gliding surface profile or smooth spikes 58 allow faster lubrication of the contact surface during the rotation of the battery cell inside its shell and lower superficial tension of liquid between surfaces leading to a smoother spinning.

In embodiments, at least part of the outer surface of the battery cell 7, for example the contact surface of the electrodes 10, 11, and/or the inner surface of the shell 3 are flexible, thereby permitting some deformation in order for example to compensate for possible mechanical deformation of the shell 3 due to mechanical stress during the life of the battery unit 1. In embodiments, the shell 3 is for example formed by two layers. The external layer is for example flexible to absorb shocks while the internal layer is rigid to guarantee rotation of the battery cell inside the shell.

Figure 14:
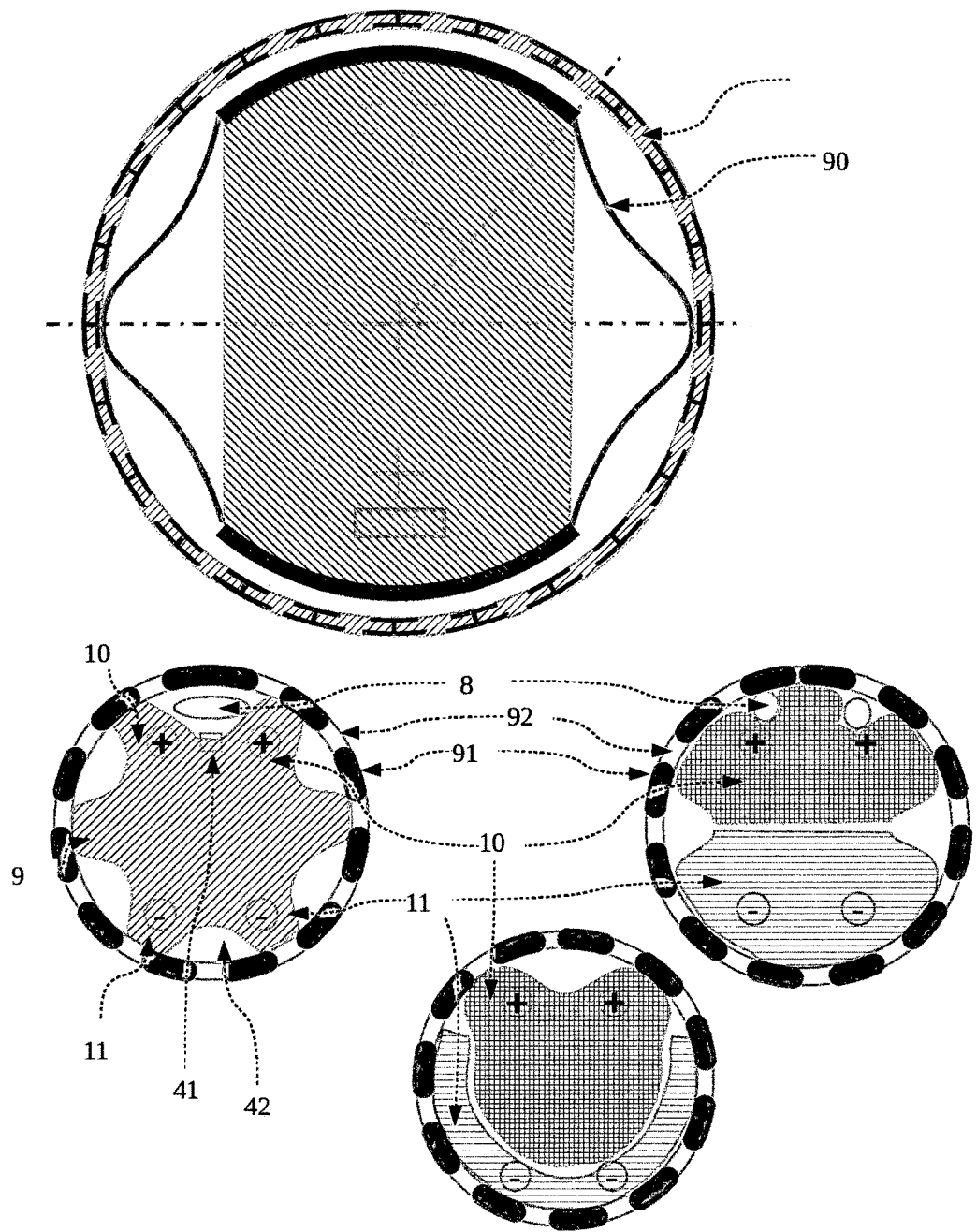
FIG. 14: Shows cut views of alternative embodiments of a battery unit according to this invention.

The upper part of FIG. 14 is a cut view of a battery unit 1 according to a variant embodiment of the invention, wherein the shell 3 forms a spherical inner space and the battery cell 7 is of a cylindrical shape with an electrode 10, 11 at each extremity. The contact surface of each electrode 10, 11 preferably forms a portion of a sphere with a radius corresponding to the radius of the inner space of the shell 3. The contact surface of the electrodes 10, 11 is for example structured as explained above. The space between the battery cell 7 and the inner surface of the shell 3 is preferably filled with an insulating lubricant 6.

According to this embodiment, the battery cell 7 optionally further comprises one or more gliding springs 90 attached to its cylindrical portion, that provide for mechanical contact between the cylindrical portion of the battery cell 7 and the inner surface of the shell 3. The gliding elements for example provide for an improved mechanical stability of the battery cell 7 inside the shell 3, facilitate the self-orientation of the battery cell 7 inside the shell 3 by providing a better gliding surface, and/or prevent deformation of the shell 3 under external pressure.

The lower part of FIG. 14 shows further embodiments of a battery unit 1 according to the invention, wherein the battery cell 7 comprises a plurality of protruding contact elements 9 that are in mechanical contact with the inner surface of the shell 3 and act as sliders holding the battery cell 7 inside the shell 3 while allowing its free spinning relative to said shell 3. In embodiments, at least part of the plurality of contact elements 9 are in electrical contact with either one of the electrodes of the battery cell 7. The space between contacts 42 between the contact element 9 is preferably filled for example with an insulating lubricant 6, with air 8, and/or with any other appropriate insulating material or vacuum. Two neighboring contact element 9 may thus have different polarities from each other, i.e. positive cathode 10, negative anode 11 or open neutral contact 69. Various embodiments of contact arrangements are shown in FIG. 14 as illustrative but in no way limiting examples.

According to the embodiments the lower part of FIG. 14, the desired orientation of the battery cell 7 within the shell 3 is achieved for example with one or more air bubble 8 captured in a specific part of the battery cell 7, preferably close to its periphery, for example in one of the space between contacts 42. As explained above in relation with other embodiments, under the effect of earth gravity, the space comprising the air bubble 8 will tend to remain on top of the battery cell 7, so that due to its own weight, the battery cell 7 will remain in the same position relative to the ground, independently of the position and/or orientation of the shell 3. The form and size of the battery cell 7 and the chemical properties of the insulating lubricant 6 are selected such as to lock the air bubble 8 in a determined part of the battery cell 7, for example thanks to superficial tension force. This solution has the advantage of being inexpensive and of not adding any weight to the battery. Furthermore, if the weight of the battery cell 7 is important relative to that of the air bubble 8, stabilization of the battery cell 7 may be achieved within a fraction of a second.

The contact between several battery unit 1 in an enclosure 15, for example after the enclosure 15 has been filled up with charged battery unit 1, is achieved in that the battery cell 7 of each battery unit 1 stabilizes itself in a determined orientation identical for all battery cell 7.

Accordingly, the electrodes of a given polarity of all battery cell 7 are in the same position relative to the geometric center of the corresponding battery cell 7, i.e. of the respective battery unit 1.

For the sake of simplicity, the invention will be described hereafter for the case where all positive contacts of each battery unit 1 are positioned in the upper half of the battery unit 1 and all negative contacts of each battery unit 1 are positioned in the lower half of the battery unit 1. Other positions of the contacts resulting from the self-orientation of the battery cell 7 within their respective shell 3 are however possible within the scope of the invention, without affecting the nature of the invention.

Figure 4:
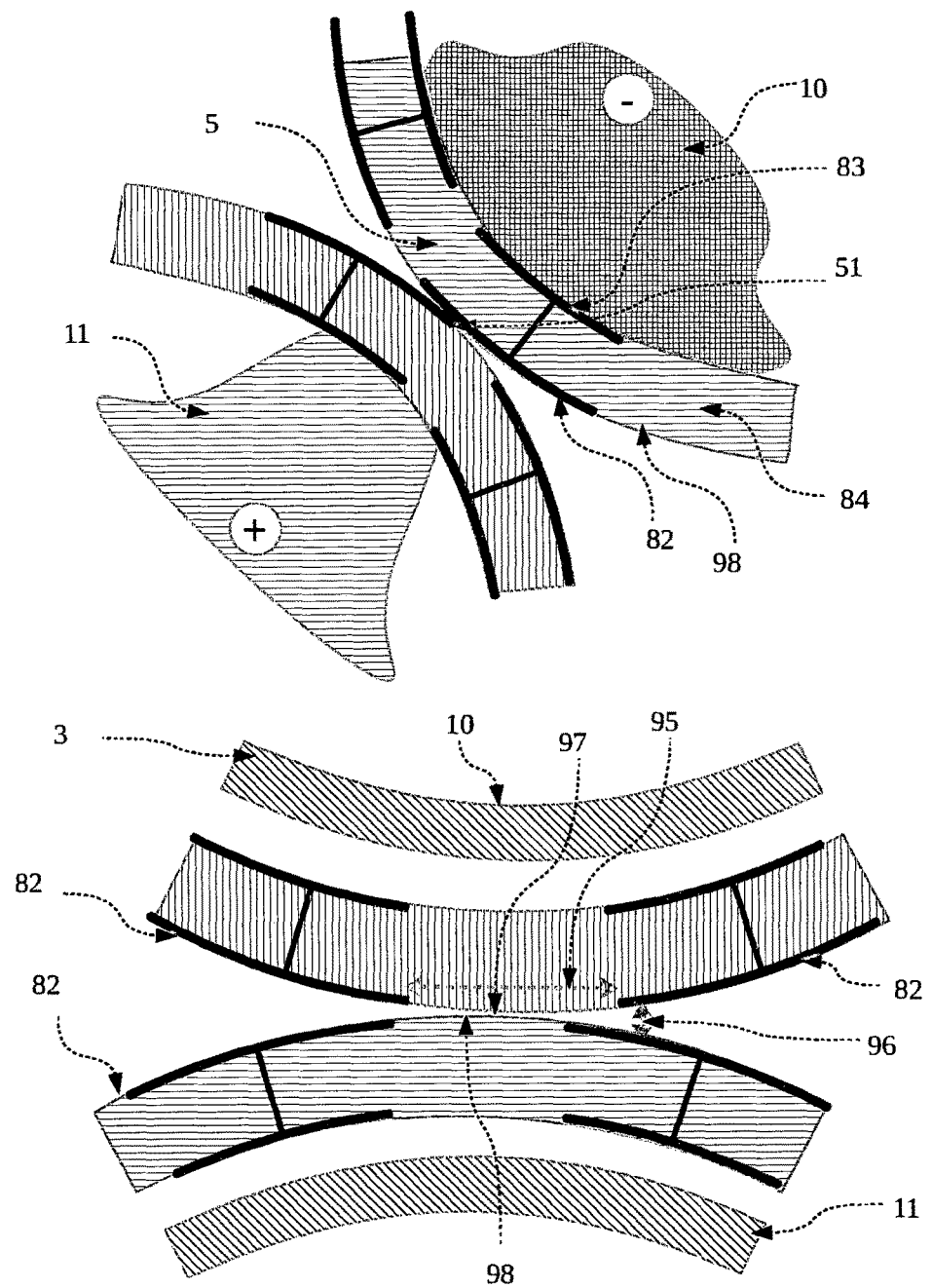
FIG. 4: shows details of contact elements of battery units according to various embodiments of the invention.

The shell 3 comprises electrically conductive outer pads 82 that are electrically insulated from each other by the insulating shell material 5 as shown for example on FIG. 4. On FIG. 4, the cathode 10 of a battery cell is in electrical contact with the anode 11 of another battery cell located above it, through contacting outer pads 82 of their respective shell 3. The connection between opposite electrodes of two adjacent battery units is thus achieved through at least some of their outer pads, thereby electrically connecting the corresponding battery units in series. In embodiments, in order to achieve contact between the shell 3 of two adjacent battery units, the surface of the outer pad 82 is preferably at least twice as large as the insulating shell material 5 separating two neighboring outer pads 82. There is preferably always an electrical contact between outer pads 82 of two contacting battery units 1 in order to achieve a current flow between them.

The presence in embodiments of isolating liquid, for example oil, between the contact element 9 and the shell 3 does not prevent electric current from passing between their respective surfaces due to their close relative position.

Figure 5:
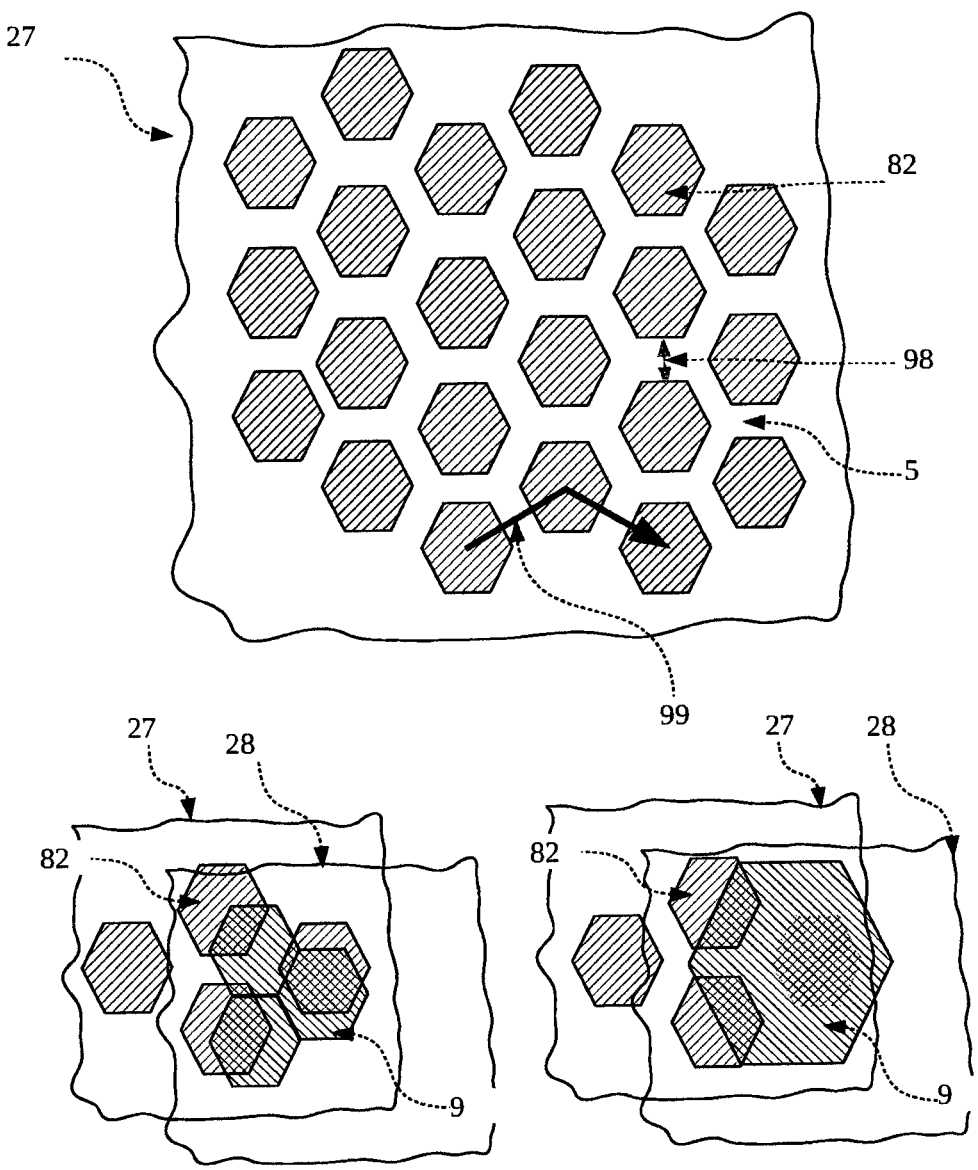
FIG. 5: is a planar representation of the surface of an outer shell of a battery unit according to an embodiment of the invention.

An example of spatial arrangements of outer pad 82 and insulating shell material 5 on the outer surface of a shell 3 is shown in the upper part of FIG. 5. The figure is a partial view of the surface of a shell "unwrapped" into a plane, similar to a world map. This example show hexagonal outer pads 82. Other shapes such as round, oval, square, rectangle, etc. are however also possible within the frame of the invention. The outer pads 82 and the insulating shell material 5 are alternated on the surface of the shell 3 such that each outer pad 82 is surrounded by insulating shell material 5.

When two adjacent battery units having a shell according to the example of FIG. 5 are in contact with each other, there is always two of their respective outer pads in contact with each other, whatever their relative orientation is. In other words, two adjacent battery units having such a designed shell 3 will allways allow electricity from flowing between them. This is achieved partly in that the distance 95 of insulating shell material 5 between two outer pads 82 of a same shell 3 is much smaller than the length of the outer pad 82. This has the effect that the probability of two outer pads 82 of two battery units 1 to be in direct contact is much higher. Another effect is that the distance 95 between outer pads of a same shell does not allow electrical contact between adjacent outer pads 82 of the same shell 3 in order to avoid electrical parasitic currents 99 on the outer and/or the inner surface of the same battery unit 1 between cathode and anode.

In the worst case illustrated on the lower part of FIG. 4, two battery units are in contact with each other by the space 98 between two adjacent outer pads 82. In this case the space 98 of two different battery units 1 in contact, are exactly in front of each other and aligned. Thus, the outer pads 82 are not in direct physical contact and there is no electric current at physical contact point 97 between the shells. However, the diameter of the battery units 1 and the size of outer pads 82 is selected in such a way that even in this configuration the maximum distance 96 between two outer pads still allows circulation of current between corresponding outer pads 82. As above, the maximum distance 96 does not allow circulation of the current between two adjacent outer pads 82 of a same shell 3 and thus formation of currents on the surface of the battery units 1 between its own cathode and anode.

Figure 16:
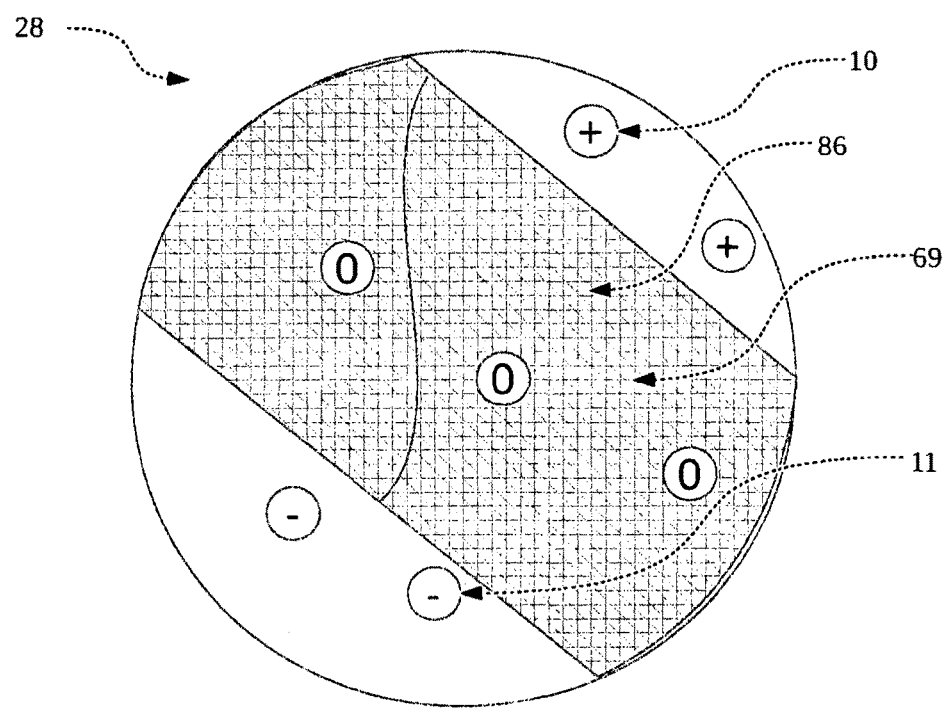
FIG. 16: Shows the inner structure of a battery cell according to an embodiment of the invention.

In embodiments where contact elements 9 are used, a different approach may be taken. The lower part of FIG. 16 shows a partial plan projection of the unwrapped surface 28 of a battery cell 7 according to embodiments of the invention, and illustrates the arrangement of the contact elements 9 on the surface of the battery cell 7. The arrangement of the contact elements 9 is configured so that, in any position of the battery cell relative to the shell, there is sufficient electric contact between the contact elements 9 and the inner pads 83 of the shell. Furthermore, the arrangement of the contact elements 9 is configured so that no electric contact is possible between contact elements of different polarities.

According to the illustrated exemplary but in no way limiting embodiments, the projection of the contact elements of the battery cell have the shape of three inner pads 83 or of a hexagon several times larger than the inner pads. In the illustrated example, the cathodes 10, the electrically neutral contacts 69 elements and the anodes 11 thus have a plan projection in the shape of three assembled hexagons, each hexagon being of the size of an inner pad of the corresponding shell. Preferably, the space between the contact elements is of the size of one such hexagon. Therefore, in any relative position of the battery cell and the shell, the two patterns, i.e. the pattern of the inner pad 83 on the shell 3 and the pattern of the contact element 9, always align in a way that there is an electrical contact between at least some inner pad of the shell 3 and the electrodes of the battery cell 7. The presence of neutral contacts 69 advantageously provides for a buffer or transition region in the outer pads of the shell. It prevents that for example a cathode 10 that is connected to two conductive padss 4 of a battery unit that are connected to two conductive pads 4 of an adjacent battery unit is connected to contacts of opposite polarity of that adjacent battery.

Figure 6:
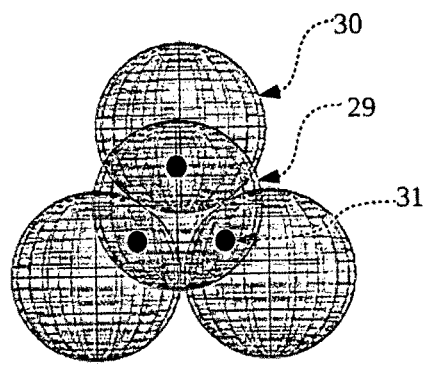
FIG. 6: illustrates possible contact geometry between battery units of the invention.
Figure 6:
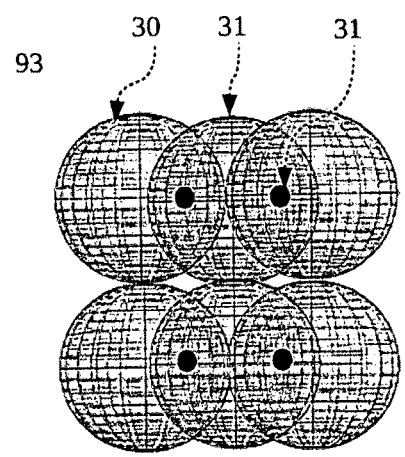
Figure 6:
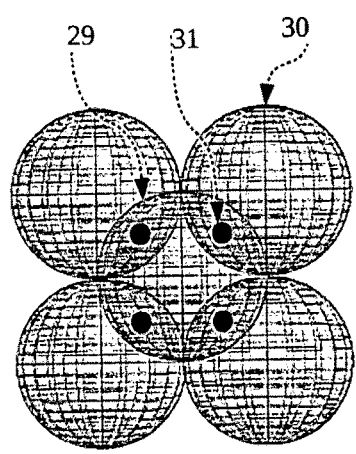
Figure 6:
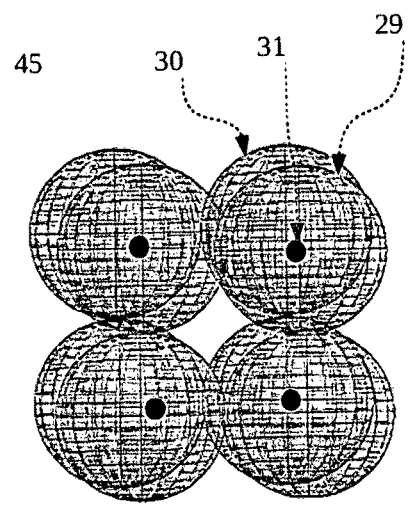

FIG. 6 illustrates different possibilities of connection between adjacent battery unit 1 when placed for example in a battery enclosure according to the invention. When the battery units 1 are filled into the enclosure, their position will be random, but the shape of the battery units 1, for example a spherical shape, leads to a number of possible arrangements, of which some are illustrated, viewed from above, in FIG. 6. Under vibration and pressure, for example, the battery unit 1 will tend to take a stable position with several points of contact. They will thus form layers of battery unit 1 and stable configurations in which batteries should operate and/or unstable configurations.

A first spatial configuration 43 is partially illustrated in the upper part of FIG. 6. In this configuration, one battery unit 1 is positioned on three others and thus each upper layer battery unit 29 has three underlying lower layer battery unit 30. Three contact points 31 are thus possible in this first configuration between the upper layer battery unit 29 and the lower layer battery unit 30.

In a second spatial configuration 44, the upper layer battery unit 29 has four underlying lower layer battery units 30. In this second spatial configuration 44, four contact points 31 are possible between the upper layer battery unit 29 and the lower layer battery unit 30.

In a third spatial configuration 45, each the upper layer battery unit 29 is positioned on top of only one lower layer battery unit 30.

In a fourth spatial configuration 93, each upper layer battery unit 29 is positioned on top of only two lower layer battery units 30.

Each of the above configurations determines another geometry of the contact element 9 between the battery units.

In the above illustrative, but in no case limiting, examples, the battery units are spherical. Other geometrical forms are however possible within the frame of the invention.

When the container of a battery assembly according to the invention is being filled with battery units, all four configurations of relative position may occur between the battery units. The battery units, in particular their outer pads, are thus configured to allow proper electric contact in all possible configurations. In the upper part of FIG. 7 is a lateral cut view of a battery unit according to an embodiment of the invention, showing the different orientations of the contacts between neighboring battery units, corresponding to the configurations of FIG. 6: the contact axis for the first configuration 32, the contact axis for the second configuration 33, the contact axis for the third configuration 34 and the contact axis for the fourth configuration 94.

The cathode 10 or contact elements 9 are thus preferably configured such that electric contact is possible in all four orientations 32, 33, 34, 94. In embodiments, the contact elements 9 of the cathode 10 for example are thus located in the uppermost position of the battery cell along a vertical axis for the first configuration, and in the range of 20-30 degrees from the vertical axis for the other configurations. The contact elements 9 of the anode 11 are preferably arranged symmetrically, i.e. in the lower most position of the battery cell along the vertical axis for the first configuration, and in the range of 20-30 degrees from the vertical axis for the second and third configuration. The cathode 10 and the anode 11 thus form two virtual spherical sectors on the surface of the battery cell 7.

In case the orientation of the battery cell 7 inside the shell 3 is achieved with an air bubble 8, this air bubble 8 is for example captured between the upper most contact element and the other contact elements of the same electrode. Two preferable arrangement of cathode 10 with their polarity are shown in the upper part of FIG. 7.

Figure 7:
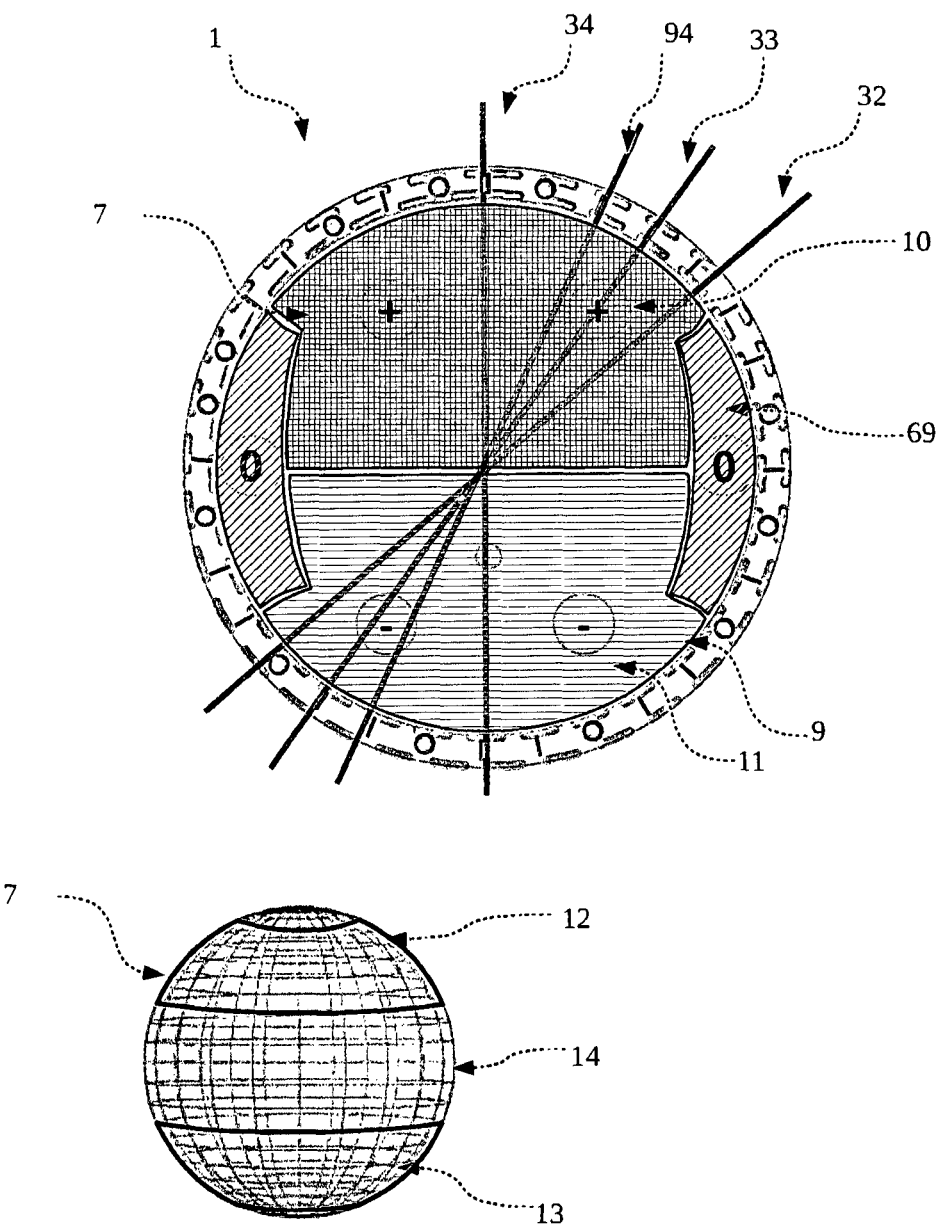
FIG. 7: shows the positions of contact elements in a battery unit according to an embodiment of the invention.

It should be noted that 3D arrangement of contact element 9 on the battery cell 7 is done in a way that those contacts are split into three groups located in belt sections on the sphere as shown on FIG. 7. contact element 9 of positive polarity are arranged in upper positive sector 12 occupying upper third of the sphere. The middle set of contacts correspond to middle neutral contact belt 14 where contacting elements does not convey any charge and serve only for guidance during rotation of the element. The negative contacts are arranged in lower negative sector 13. Top view is shown on the lower part of the figure.

Figure 8:
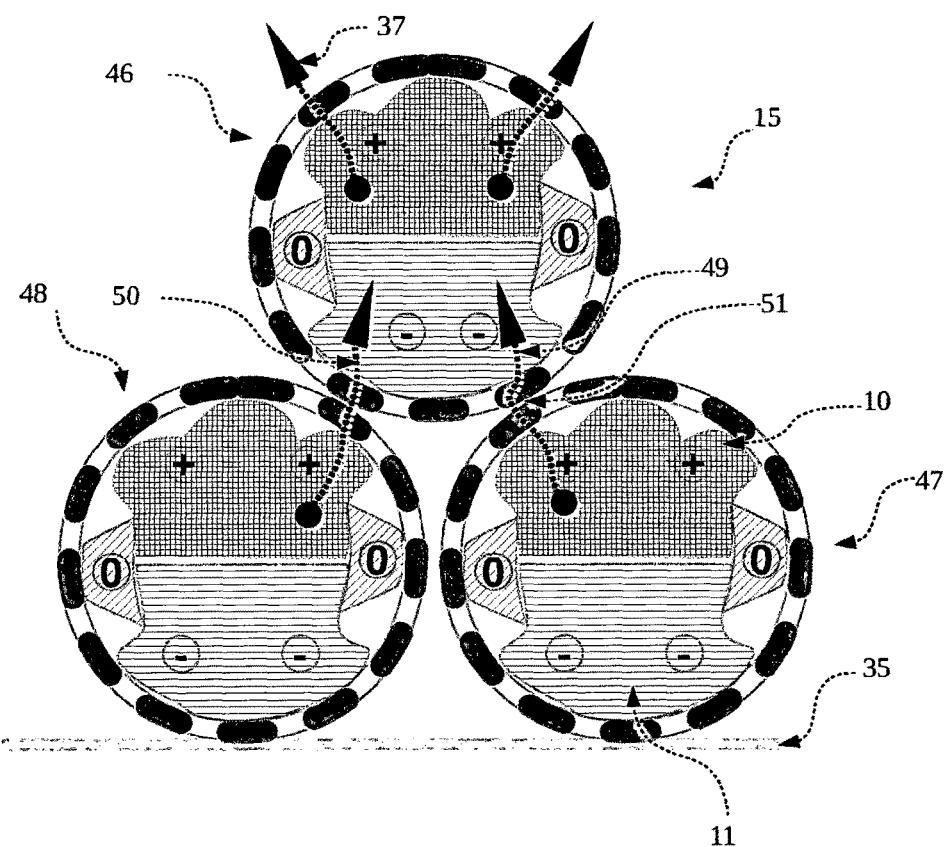
FIG. 8: is a cut view illustrating an example of an electric circuit formed by battery units according to an embodiment of the invention when stacked on a horizontal platform.

When the enclosure 15 is filled with battery units is oriented horizontally, the battery units find themselves in the situation illustrated in FIG. 8, corresponding to a horizontal orientation 35 of the enclosure 15. For simplicity of referencing, three battery units are labeled battery unit A 46, battery unit B 47, and battery unit C 48. Due to the self-orientation of the internal elements, the cathodes 10 are found in the upper part of each battery unit. The pads of shell 3 have geometry and positions explained above that allow that two outer pad 82 on the surface of two ajacent battery units will be in contact with each other. This contact corresponds on the figure to contact 51. So, the cathode 10 of battery unit B 47 is in contact with an outer pad 82 of its surface which, in turn, is in contact with outer pad 82 of battery unit A 46 which, in turn, is in contact with the anodes 11 of battery unit A 46. This sequence of contacts allows electric A-to-B current 49 to flow from battery unit B 47 to battery unit A 46. In a similar fashion, electric A-to-C current 50 is flowing from battery unit C 48 to battery unit A 46.

Figure 9:
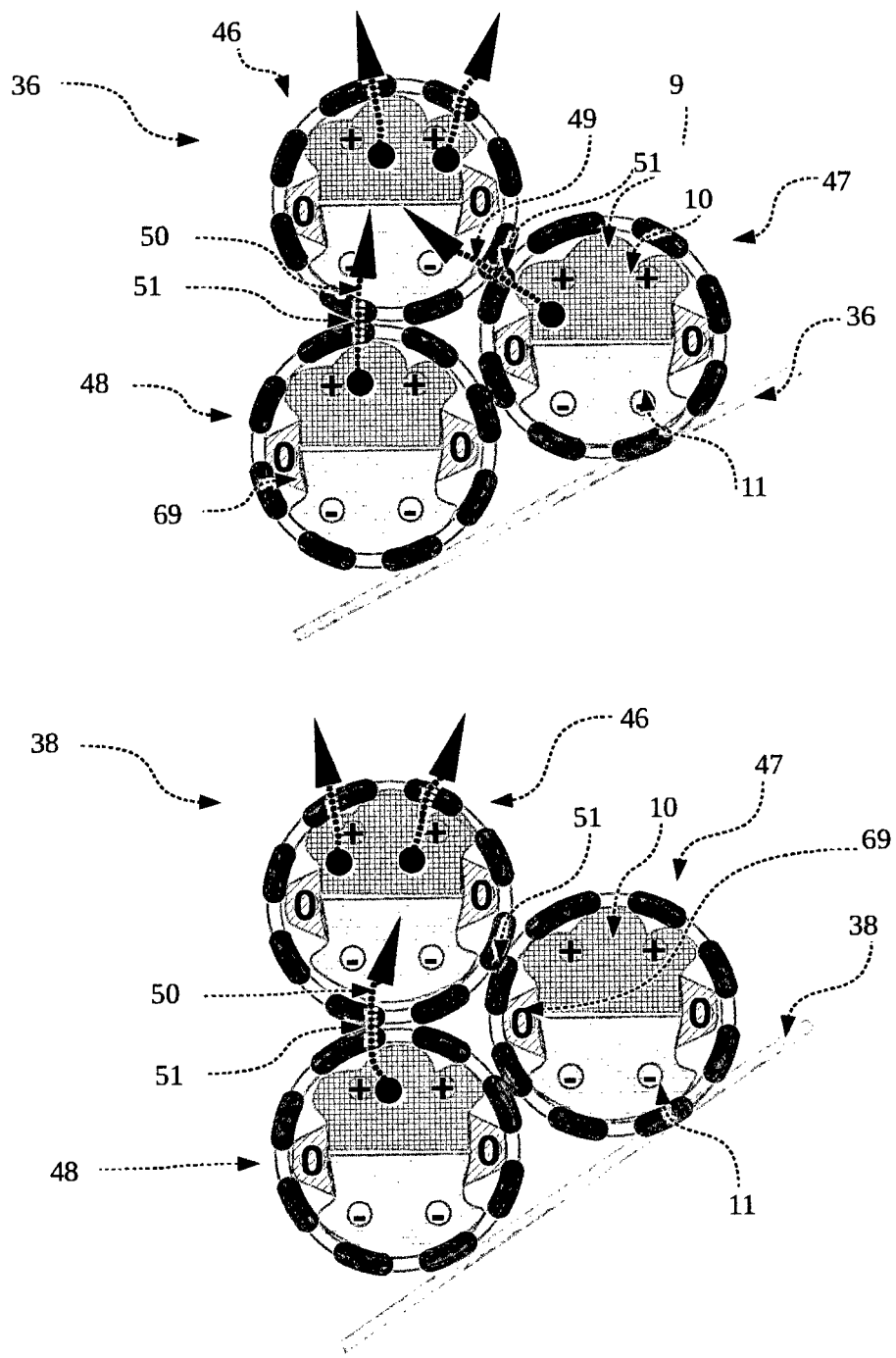
FIG. 9: shows cut view illustrating possible electric circuits formed by battery units according to an embodiment of the invention when stacked on a tilted platform.

FIG. 9 illustrate situations where the enclosure's floor, is not perpendicular to the orientation axis of the battery cells. This may occur for example if the electric vehicle, in which the battery assembly of the invention is installed, drives on a slope and/or takes a sharp curve at a relatively high speed and the battery cells are oriented under the effect of the earth gravity and/or of centrifugal forces.

On the upper half of FIG. 9, under a first possible orientation of the enclosure 36 relative for example to the ground, the relative orientation of the shells 3 of battery unit A 46, battery unit B 47, and battery unit C 48, and thus conductive pads 4 therebetween, remains the same as in the example illustrated in FIG. 8. The contact 51 for example remains in the same position. However, the battery cells 7 change their orientation relative to the shells 3, such that another contact element 9 is now in contact with the inner pad corresponding to contact 51. The electric A-to-B current 49 and A-to-C current 50 thus still flow.

On the lower half of FIG. 9 is shown a configuration where at least some electric current trajectories are open due to an orientation of enclosure when switching occurs 38. The relative orientation of the shells 3 of battery unit A 46, battery unit B 47, and battery unit C 48, remains the same as in the examples illustrated above. The contact 51 also remains in the same position.

In this orientation of the enclosure, however, and thus in the resulting orientation of the battery cells 7 relative to their respective shells 3, the cathode 10 of battery unit B 47 can not be linked through the contact 51 to the anode 11 of battery unit A 46. The cathode 10 of battery unit B 47 is in contact with neutral contact 69 only, thus cutting the electric A-to-B current 49. A-to-C current 50, however, is maintained. The situation illustrated in the lower half of FIG. 9 corresponds to one of the configurations illustrated in FIG. 6, namely the situation where two battery units are located one on top of each other, which is also a functional situation of the battery assembly of the invention. The battery unit of the invention, in particular the design scheme of its contacting elements and conductive pads allows establishing electric currents between the battery units, whatever their orientation is.

In embodiments, the battery units orient themselves after the tank has been filled with battery units. The orientation of the battery units is then locked by an adapted mechanism, for example under the effect of a weak electric current the battery cells 7 expand in one direction, thereby preventing them from rotating/spinning inside their respective shell once the battery assembly of the invention is formed and operating.

Figure 10:
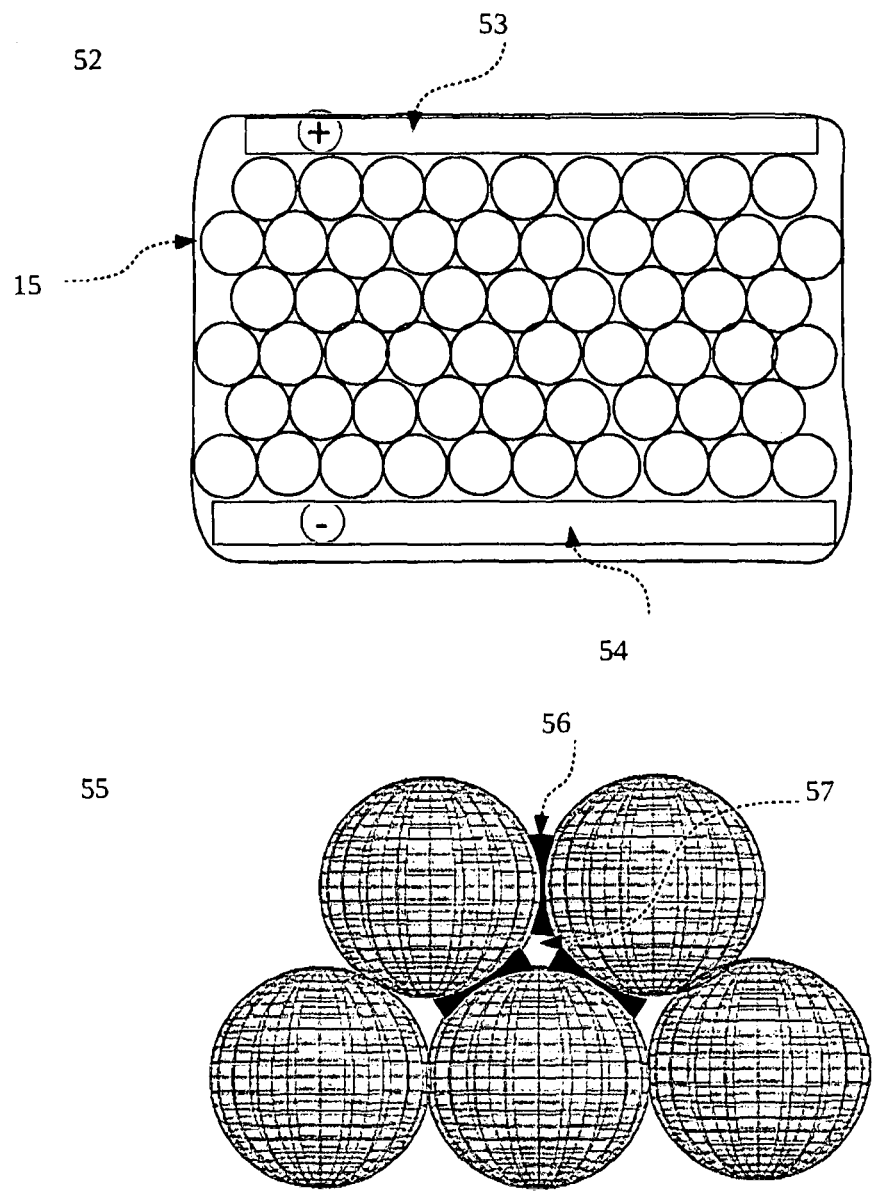
FIG. 10: is a schematic cut view of a battery assembly according to an embodiment of the invention.

The upper half of FIG. 10 schematically illustrates the overall configuration of a battery assembly according to the invention. When the enclosure 15 is filled with battery units, the bottom part of the tank plays for example the role of the assembly anode 54. The assembly cathode 53 is for example located in the upper part of the enclosure 15. In order for battery units to stay in place during motion of the electric vehicle, for example, various solutions are possible within the frame of the invention. In embodiments, for example, the assembly cathode 53 comprises an inflatable portion that presses the battery units towards the bottom of the enclosure 15. In other embodiments, the assembly cathode 53 comprises mechanical elements, for example hydraulic or pneumatic, for pushing the battery units towards the bottom of the enclosure 15 and thereby preventing them from moving. In still other embodiments, a lower atmospheric pressure in the enclosure 15 squeezes its flexible wall(s) to press the battery units in place against each other. In embodiments, the enclosure 15 comprises one or more separator walls in order to limit the movements of the battery units inside it. The above solutions, and other means, can of course be combined in order to prevent the battery units from moving inside the enclosure 15 when the battery assembly of the invention is in use.

The lower half of FIG. 10 shows how humidity, frost and battery cooling is managed in a battery assembly according to embodiments of the invention. Condensation of water on the surface of the battery units is hardly avoidable. However, by selecting appropriate diameter of the battery units, a given superficial tension of liquid water can be achieved such that the humidity will remain only in humidity accumulation places 56. Humidity in these specific humidity accumulation places 56 will furthermore favor electrical conductivity between neighboring battery units.

Some aeration space 57 is furthermore preferably left free from water. Battery units tend to heat during operation. The aeration space 57 allows air circulation between the battery units, which is for example forced through the enclosure 15 with fans, in order to control the temperature of battery units. In case of low external temperatures, a flow of warm air may furthermore be foreseen in order to prevent the water between the battery units from freezing.

Figure 11:
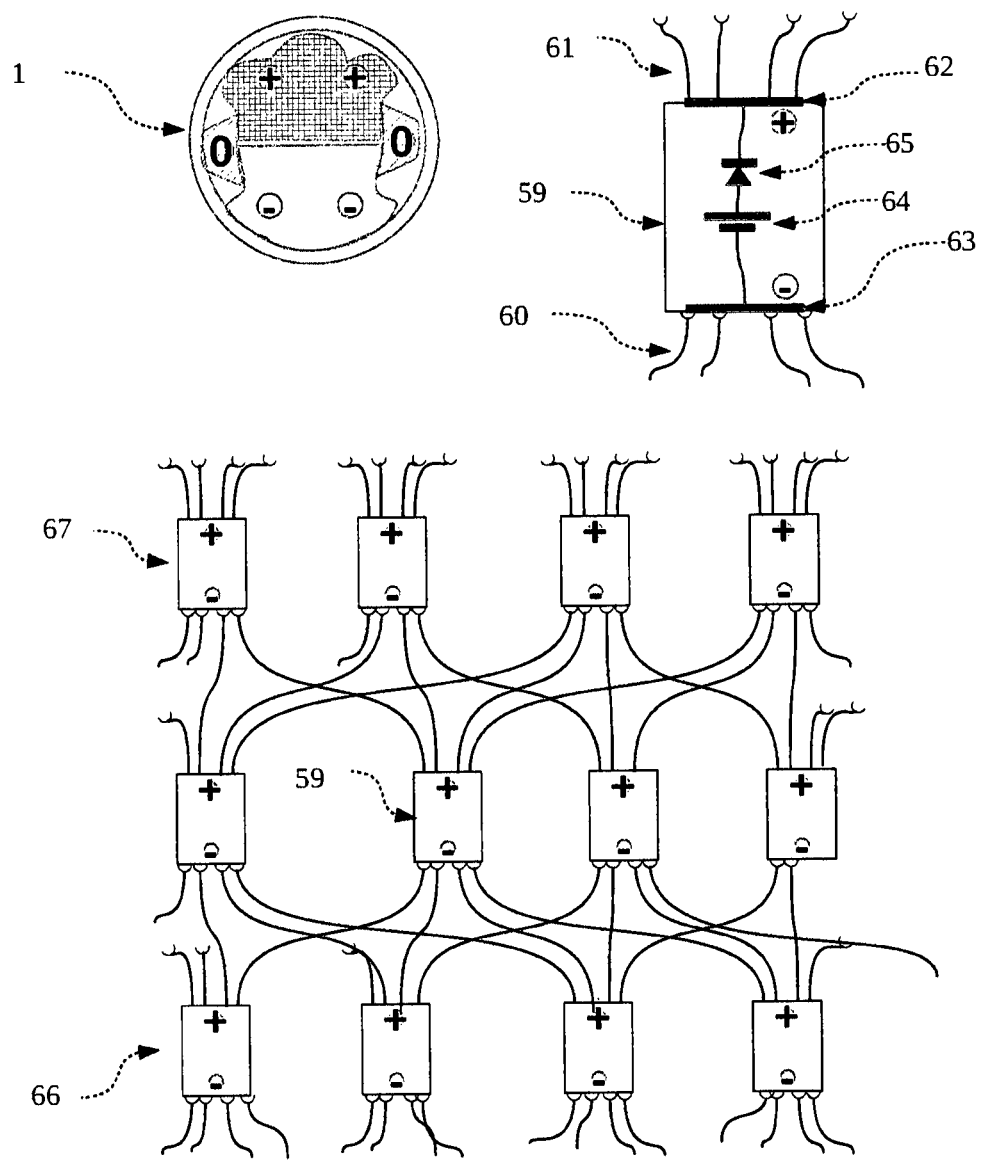
FIG. 11: illustrates an electric circuit formed by stacked battery units of the invention.

The electric properties of individual battery units are schematically illustrated on FIG. 11. Because of different spatial configurations inside the enclosure 15, each battery unit may be in contact with one, two, three or four other battery units on top and/or with the same number of battery units on the bottom. Each battery unit 59 may thus be modeled as an electric source with incoming contacts 60 and outgoing contacts 61. Each battery unit 59 for example comprises positive contacts 62, negative contacts 63 and a voltage source 64. If for some reason the battery cells is blocked inside the shell and remains in a wrong orientation, a security diode 65 will prevent electric current from flowing in the wrong direction.

The electric behavior of a combination of battery units is regulated by the two Kirchhoff laws. The first says that sum of the incoming and the outgoing currents in one point is equal to 0. The second law states that voltage in every closed circuit is equal to 0.

Figure 12:
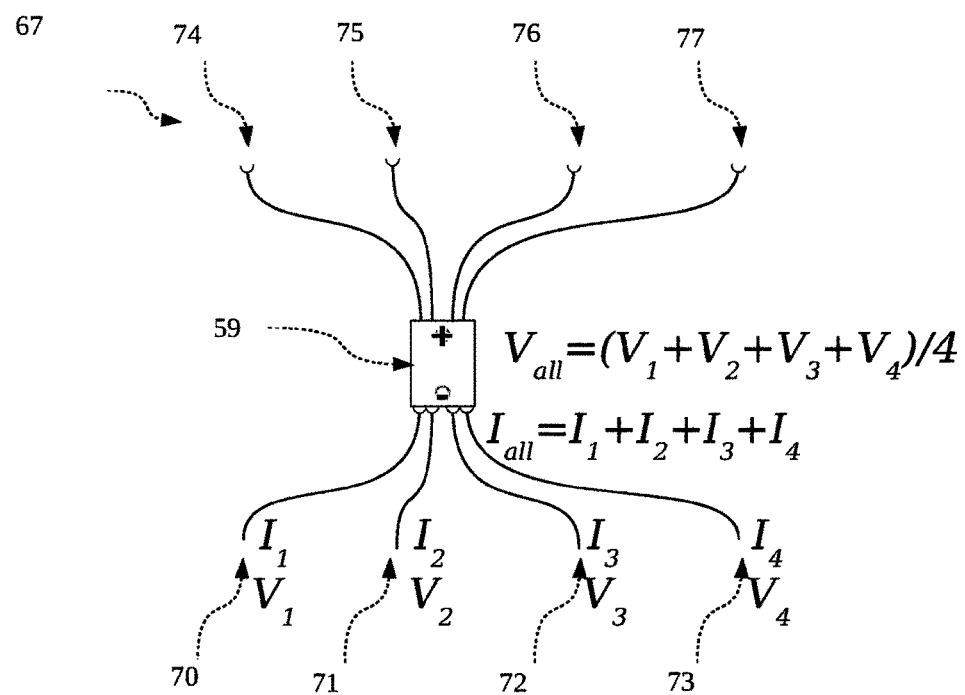
FIG. 12: shows the currents and voltages in a battery unit according to the invention when stacked.

The behavior of a battery assembly 89 results from the combination of individual battery units. FIG. 12 shows the electric combination of battery units and the resulting voltage. If each battery unit provides unitary voltage 78 and unitary current 79, a battery unit 59 will be subjected to the currents and voltages incoming from previous batteries 66. At the maximum, four incoming currents and four outgoing currents are present: current one 70, current two 71, current three 72, current four 73, current five 74, current six 75, current seven 76, current eight 77.

If all currents are present, then the battery unit 59 is subjected to four incoming currents and four incoming voltages. The resulting voltage is an average of the incoming voltages. The battery unit 59 then adds its own unitary voltage 78 and "distributes" the resulting voltage to the next batteries. The electric tension provided by the battery assembly thus increases with each layer of battery units.

When one or more battery unit doesn't function properly, it may for example be partially discharged or completely deactivated.

Figure 13:
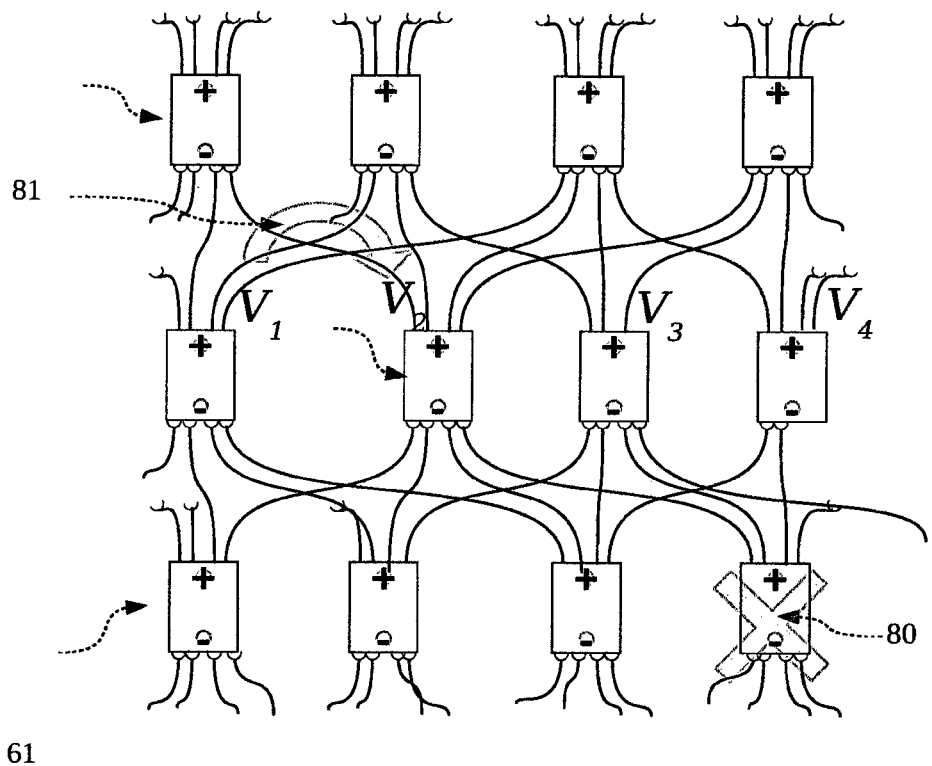
FIG. 13: illustrates an electric circuit formed by stacked battery units of the invention in the case of a defective battery unit.

If one battery unit is not functional, one of the incoming currents and voltages to battery unit 59, for example, is absent. Consequently, the current and voltage at the entry of the battery unit are lower. Current $I_{tot}$ and voltage $V_{tot}$ are lower. Because of this voltage drop, two battery units in the same layer may have different output voltage, as illustrated for example on the lower half of FIG. 13. If one battery unit is damaged, the defective battery unit 80, the voltage $V_1$ is less than $V_2$, $V_3$ and $V_4$. A parasitic current 81 thus results from this difference between $V_1$ and $V_2$. The security diode 65 will prevent electric current from flowing in the wrong direction, but due to the defective battery unit 80, the contribution of three battery units will be lost.

LIST OF REFERENCES 1 battery unit
2 shell (additional)
3 shell
4 conductive pads
5 insulating shell material
6 insulating lubricant
7 battery cell
8 air bubble
9 contact element
10 cathode
11 anode
12 upper positive sector
13 lower negative sector
14 middle neutral contact belt
15 enclosure
16 pistol
17 battery units (additional)
18 first opening
19 filled tank
20 negative contacting element
21 positive contacting element
22 charge control station
23 parallel charging station
24 charged battery units reservoir
25 provide charged batteries
26 load the tank with charged battery units
27 unwrapped surface of outer shell (view from inside)
28 unwrapped surface
29 upper layer battery unit
30 lower layer battery unit
31 contact points
32 contact axis for the first configuration
33 contact axis for the second configuration
34 contact axis for the third configuration
35 horizontal orientation
36 possible orientation of the enclosure
37 possible electric current trajectory
38 orientation of enclosure when switching occurs
39 switching situation
40 second opening
41 switch off contact
42 space between contacts
43 first spatial configuration
44 second spatial configuration
45 third spatial configuration
46 battery unit A
47 battery unit B
48 battery unit C
49 A-to-B current
50 A-to-C current
51 contact
52 side view of the filled enclosure
43 assembly cathode
54 assembly anode
55 illustration of humitidy and aeration
56 humidity accumulation
57 aeration space
58 gliding surface profile or smooth spikes
59 battery
60 incoming contacts
61 outgoing contacts
62 positive contact
63 negative contact
64 voltage source
65 security diode
66 previous batteries
67 subsequent batteries
68 spaces between contacts
69 neutral contact
70 current one
71 current two
72 current three
73 current four
74 current five
75 current six
76 current seven
77 current eight
78 unitary voltage
79 unitary current
80 defective battery unit
81 parasitic current
82 outer pad
83 inner pad
84 conductive rod

The invention claimed is:
1. A battery unit (1) comprising:
a shell (3) in an electrically insulating shell material (5) with a plurality of electrically conductive outer pads (82) on an external surface of said shell (3), said conductive outer pads (82) being electrically insulated from each other;
a battery cell (7) within said shell (3) for storing and providing electrical energy, said battery cell (7) comprising an anode (11) and a cathode (10);
wherein at least some outer pads (82) of said plurality of outer pads (82) are in electrical contact either with said anode (11) or with said cathode (10),
characterized in that the polarity of each outer pad (82) of said at least some outer pads (82) depends on its position relative to a geometric center of said battery unit (1) in a referential determined by the direction of an external force, independently from the orientation of said battery unit (1) within said referential.
2. The battery unit (1) according to claim 1, wherein said battery cell (7) is freely orientable within said shell (3), said battery cell (7) being configured for being orientable under the effect of said external force.

3. The battery unit (1) according to claim 2, wherein said external force is earth gravity.

4. The battery unit (1) according to claim 3, wherein a center of gravity (85) of said battery cell (7) doesn't coincide with the geometric center (87) of said battery cell (7).

5. The battery unit (1) according to claim 4, wherein said anode (11) and said cathode (10) are located on a surface of said battery cell (7) on opposite sides of said battery cell (7) from each other, proximate to a symmetry axis (88) going through said center of gravity (85) and through said geometric center (87).

6. The battery unit (1) according to claim 1, wherein the outer pads (82) in electrical contact with said anode (11) are within a lower half of said battery unit (1) and the outer pads (82) in electrical contact with said cathode (10) are located within an upper half of said battery unit (1) when said battery cell (7) is in a stable position relative to said external force.

7. The battery unit (1) according to claim 1, wherein the outer pads (82) in electrical contact with said cathode (10) are all located within an upper half of said battery unit (1) and the outer pads (82) in electrical contact with said anode (11) are all located within a lower half of said battery unit (1) when said battery cell (7) is in a stable position relative to said external force.

8. The battery unit (1) according to claim 1, said shell (3) forming a spherical interior space and said battery cell (7) inside said shell (3) being freely rotatable around any axis relative to said shell (3).

9. The battery unit (1) according to claim 1, said shell (3) further comprising electrically conductive inner pads (83) on an inner surface of said shell (3), wherein each outer pad (82) is in electrical contact with an inner pad (83).

10. The battery unit (1) according to claim 9, wherein said anode (11) and said cathode (10) are portions of the surface of said battery cell (7) in electrical contact each with at least some of the inner pads (83).

11. A battery assembly (89) for an electric device, said battery assembly comprising:
  a plurality of battery units (1) according to claim 1;
  an enclosure (15) for containing said battery units (1);
  an assembly cathode (53) located on a first side of said enclosure (15), said assembly cathode (53) being in electrical contact with outer pads (82) of battery units (1) of said plurality of battery units (1) that are in contact with said first side;
  an assembly anode (54) located on a second side of said enclosure (15) opposite said first side, said assembly anode (54) being in electrical contact with outer pads (82) of battery units (1) of said plurality of battery units (1) that are in contact with said second side.

12. The battery assembly (89) according to claim 11, wherein said enclosure (15) comprises at least one opening for loading said battery units (1) into said enclosure (15) and/or for removing said battery units (1) from said enclosure (15).

13. A method for providing electrical energy to an electric device, said method comprising the steps of:
  providing a plurality of charged battery units (1) according to claim 1;
  randomly filling an enclosure (15) of a battery assembly (89) with said plurality of battery units (1);
  applying an external force to said battery units (1) within said enclosure (15) for orienting the polarity of the outer pad (82) of said battery units (1) all in the same orientation relative to said external force.

* * * * *